United States Patent Office 3,413,089
Patented Nov. 26, 1968

3,413,089
PROCESS FOR THE PRODUCTION OF PEROXIDES
Fernand Coussemant and Jean Vidal, Paris, France, assignors to Institut Francais du Petrole, des Carburants et Lubrifiants, Rueil-Malmaison, Hauts-de-Seine, France
No Drawing. Filed Jan. 7, 1966, Ser. No. 519,006
Claims priority, application France, Jan. 9, 1965,
1,411; Aug. 20, 1965, 29,054
16 Claims. (Cl. 23—184)

ABSTRACT OF THE DISCLOSURE

To produce alkali metal peroxides, the steps of contacting a solution of non-enolizable ketone, such as benzophenone, in a liquid hydrocarbon, such as benzene, with an alkali metal preferably in amalgam form; and reacting the resultant dissolved reaction product with molecular oxygen to form said alkali metal peroxides which separate as solids from the solution. To increase the solubility of the metal-ketone compound as well as the efficiency of the process, it is preferred to add a Lewis base, such as hexamethylphosphoramide, to the ketone solution.

---

This invention relates to an improved process for the production of peroxides and especially peroxides of the alkali metals.

Alkali metal peroxides, such as sodium peroxide, are useful oxidizing agents, and are sold extensively as bleaches. In addition, such peroxides can be converted by known processes into other peroxides, notably hydrogen peroxide, peracids, and persalts.

An object of this invention is to provide an improved process for the production of peroxides and the like, and compositions of matter associated therewith.

Upon further study of the specification and claims, other objects and advantages of the present invention will become apparent.

In the following description of this invention the expression "alkali metal peroxide" covers not only the peroxide proper as for example $Na_2O_2$ or $K_2O_2$, but also the superoxides, especially $NaO_2$ or $KO_2$, which are usually present in mixtures.

To achieve the objectives of the present invention, a comprehensive process is provided wherein a solution of a non-enolizable ketone in a liquid hydrocarbon is contacted with an amalgam of an alkali metal, and the resultant solution is reacted with molecular oxygen to form a peroxide of the alkali metal which separates from the solution as a solid.

This process readily lends itself to industrial use by the continuous or batch method and has the advantage of requiring only inexpensive reagents or those which can be easily regenerated.

The molecular oxygen is preferably employed in the form of air, although greater or lesser concentrations are also satisfactory.

During the initial stages of the oxidation the peroxide is the principal product, but if the oxidation is continued, the superoxide becomes the main, or in fact the only product, especially when potassium is employed as the alkali metal.

The separation of the peroxide is effected, for example, by filtration or contrifugation. The peroxide can, however, be used without being separated since as a suspension in the organic solution, it can then be converted into different peroxides.

When a peroxide suspension is converted into $H_2O_2$ by acid hydrolysis, the kentonic solution will not become diluted with water because such solutions are substantially water immiscible. The ketone solution can then be used again in a subsequent operation after being freed from any traces of water that it may contain.

Thus, in a preferred continuous form of this process the liquid phase consisting essentially of a solution of a non-enolizable ketone in a hydrocarbon is regenerated and used as a solvent for the alkali metal of the amalgam.

The ketone that is used is preferably of the formula R—CO—R' in which at least one of the radicals R and R' is a monovalent homocyclic or heterocyclic aromatic radical of preferably more than 5 carbon atoms, or a radical of the formula:

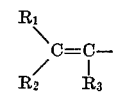

wherein $R_1$ and $R_2$ are hydrogen atoms or monovalent hydrocarbon radicals of preferably not more than 20 carbon atoms and $R_3$ is a monovalent hydrocarbon radical of preferably not more than 20 carbon atoms, and where only one of the radicals R and R', if not defined as above, can represent a monovalent aliphatic or cycloaliphatic hydrocarbon of preferably not more than 20 carbon atoms completely substituted in the α-position (i.e.—the carbon atoms next to the CO group must not carry any hydrogen atoms).

Benzophenone is a preferred ketone, although benzophenones that have been substituted by groups inert toward alkali metals, or aliphatic ketones that satisfy the above-mentioned condition can likewise be used. Similarly, optionally substituted anthraquinones or fluorenones can also be used.

Among the ketone which can be used in this invention are for example especially benzophenone, fluorenone, as well as derivatives thereof which are alkylated in any positions by alkyl of 1–10 carbon atoms on one or both of the aromatic nuclei, phenyl-biphenyl-ketone, di-biphenyl-ketone, xanthone, phenyl-naphthyl-ketone, di-naphthyl-ketones, 2-propenyl - phenyl - ketone, α-pyridyl-phenyl-ketone and 2-propenyl-t-butylketone.

Any alkali metal can be used, but sodium and potassium are preferred. The proportion by weight of alkali metal to mercury in the amalgam is preferably 0.1–0.4%.

The knowledge of the precise structural formula of the metal-ketone compound is immaterial since this intermediate compound is subsequently oxidized to peroxide with regeneration of the initial ketone.

Although the synthesis of the metal-ketone compound from ketone and amalgam is preferred, a similar manufacturing process could be used, for example by reacting the ketone-hydrocarbon solution with free alkali-metal.

As the solvent for the alkali metal-ketone product an aromatic hydrocarbon is preferred, especially benzene, toluene, ethyl-benzene or a xylene, although heavier hydrocarbons are also suitable. Saturated or monoolefinic aliphatic or cycloaliphatic hydrocarbons can also be used, for example pentane, heptane, hexadecane, cyclohexane, cyclohexene. Mixtures of these, especially from the petroleum fractions, can also be suitable. Preference is given, however, to liquid hydrocarbons containing 5 to 20 carbon atoms, especially those with 6 to 10 carbon atoms per molecule. The particularly preferred solvent is benzene.

The ketone concentration can vary widely, although best results are obtained with solutions containing from 0.05 to 1 mole ketone per liter of solution. With more dilute ketone solutions, the large volumes are a needless inconvenience; whereas with solutions that are too concentrated, the viscosity presents problems.

It is best to use 1 to 3 moles of ketone per gram-atom of alkali metal. Smaller proportions can, however, be used, and for example, 0.1 mole of ketone per gram-atom of alkali metal if only a partial dissolution of the alkali metal is sufficient. The recycling of the regenerated ketone after oxidation or the simultaneous operation of the dissolution and oxidation stages makes it possible to obtain rapid dissolution with only a small amount of ketone. On the other hand, it is possible, without inconvenience, to use a large excess of ketone e.g. 5 moles of ketone per gram atom of alkali metal, but the required volumes will then be greater.

The dissolution of the alkali metal and the oxidation of the ketone solution can be performed at any temperature (as long as a liquid phase is present), but the less elevated temperatures, e.g. between —10 and +70° C., are preferred.

The optional hydrolysis of the peroxide is preferably performed with an aqueous solution of a compound which can react with the alkali metal hydroxide liberated by the hydrolysis. For example, aqueous solutions of acetic acid, hydrochloric acid, sulfuric acid, or of an alkali metal borate (possibly in the presence of carbon dioxide) can be used. It is also possible to convert the peroxide into $H_2O_2$ by the action of glacial acetic acid or in any other manner. The peroxide can also be converted into a percarbonate by the action of carbon dioxide on the suspension of the peroxide in the ketone.

The temperature of the hydrolysis can be, for example, between 0 and 50° C. and preferably between 10 and 25° C.

A preferred embodiment of this invention comprises the addition of a Lewis base to the ketone solution in the hydrocarbon. The solubility of the metal-ketone compound is thereby increased, and concomitantly the efficiency of the process. The concentration of the Lewis base can vary widely, for example between 0.01 mole/liter and 1 mole/liter. Although it is preferable to introduce the Lewis base into the ketone solution before the latter is brought into contact with the amalgam, a Lewis base can also be added to a dispersion of the metal-ketone compound which has already been largely precipitated. There is then an immediate re-dissolution.

Any Lewis base can be used. The following classes are particularly preferred:

Hexalkyl-phosphor-amides, for example hexamethyl-phosphor-amide,

Sulfones, for example tetramethylene-sulfone,

Sulfoxides, for example dimethyl-sulfoxide and diphenyl-sulfoxide,

Tetrasubstituted ureas, for example tetramethylurea,

Disubstituted amides, for example dimethylformamide,

Tertiary nitrogen bases, for example pyridine, quinoline, tertiary amides or N-methyl-pyrrolidone.

The most effective Lewis base is hexamethylphosphor-amide.

When the process of this invention is to be performed by the continuous method, it will be possible to operate in two distinct zones which are successively traversed by the ketone solution. The alkali metal amalgam is, for example introduced at a point in the first zone, and after the alkali metal is exhausted therefrom, the spent amalgam is withdrawn at another point in this zone. The solution of the resulting metal-ketone compound then passes into the second zone which is supplied with oxygen or some other gas containing molecular oxygen. From this second zone there is obtained first, the effluent oxidizing gas, and second, a suspension of peroxide which is subjected to a liquid-solid separation, for example by centrifuging or decanting. The recovered solution of ketone in hydrocarbon is recycled to the first zone; and the spent amalgam is returned to the cathode of an electrolytic cell for replenishment of the amalgam with alkali metal.

It has also been found that the solution of the alkali metal and the oxidation of the metal-ketone compound can be accomplished very simply in a single apparatus, provided direct contact of the oxidizing gas with the amalgam is prevented.

It is possible, for example, to circulate the amalgam in a lower level of the apparatus, in contact with the ketone solution above the amalgam, the oxidizing gas being introduced into the ketone solution at a level higher than that of the ketone-amalgam interface. Because of the agitation caused by the oxidizing gas, the metal-ketone compound is oxidized soon after its formation and its concentration remains low. The alkali metal is, therefore, converted into the peroxide almost instantaneously.

Contact of the organic phase with the amalgam is assured, preferably by trickling a thin layer of the latter to the bottom of the reaction apparatus. The contact between the oxygen and the organic phase can be assured by any known means, for example by bubbling, mechanical agitation, or trickling of the organic phase in a thin layer. This contact should preferably be sufficiently effective so that the total speed of reaction will be limited only by the rate of transfer of the alkali metal from the amalgam to the organic phase.

The alkali metal that is in the amalgam can be completely dissolved out, which can be verified e.g. by the absence of any reaction between the spent amalgam and an aqueous solution of sulfuric acid.

In proportion to the extent of transformation, there is observed in the organic phase a precipitate which can be easily separated by decantation or filtration and which, after washing with a hydrocarbon or other inert solvent and drying, can be identified as a peroxide of the alkali metal.

By contacting the ketonic solution with oxygen until absorption of the latter ceases, there is obtained the superoxide in a high state of purity. With a smaller absorption of oxygen, about one half-mole of oxygen per gram-atom of alkali metal, the proportion of normal peroxide will be increased.

After separation of the oxidized compounds, the organic phase is recycled.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

A solution of 0.125 mole benzophenone and 0.025 mole hexamethyl-phosphoramide in toluene (total volume 250 cc.) is agitated at 30° C. in contact with an amalgam containing 0.5% sodium corresponding to 0.11 gram-atom of sodium, 91% of the sodium passing into the solution. Air is then introduced until there is no longer any precipitation of the higher oxides of sodium, which are then separated by centrifuging. The yield of these peroxides reaches 90% on the basis of the sodium extracted from the amalgam. The liquid phase can be used anew for fixing sodium.

To prepare hydrogen peroxide, the alkali metal peroxide solids are treated with 100 cc. 2 N hydrochloric acid. The hydrogen peroxide that is obtained in a molar yield of 76% can be separated and concentrated by the usual physical methods.

Example 2

710 grams of 0.45% by weight sodium amalgam (0.140 gram-atom of sodium), are dissolved with agitation at ordinary temperature in 500 cc. benzene containing 30 grams benzophenone. After 30 minutes, the organic phase has completely congealed. An addition of 9 grams hexamethyl-phosphoramide permits complete and practically instantaneous redissolving of the metal-ketone compound. An analysis of the organic phase leads to the conclusion that there has been a complete transfer of the sodium to this latter phase and that the amount of alkali metal in the amalgam has been reduced to mere traces.

The yield of peroxides of sodium is 93% on the basis of the sodium extracted from the amalgam.

By operating as in Example 1, an 80% theoretical molar yield of $H_2O_2$ is obtained.

This example shows that a slight excess of benzophenone permits a quantitative extraction of the sodium from the amalgam and that at any moment during the extraction, the addition of hexamethyl-phosphoramide permits redissolving of the precipitate that is eventually formed.

Example 3

Example 1 is repeated with an amalgam of 0.22% sodium in amount corresponding to 0.13 gram-atom of sodium. The amount of the sodium that is extracted reaches 77% and the yield of peroxide and hydrogen peroxide remains the same.

Example 4

Example 1 is repeated, but instead of the hydrochloric acid treatment, the oxides are treated with 100 cc. of a 10% acetic acid solution in toluene, followed by an extraction of the hydrogen peroxide by 100 cc. of water. The yield of hydrogen peroxide is 90% of the theoretical.

Example 5

If 2 N sulfuric acid is substituted for the hydrochloric acid of Example 1, the yield of hydrogen peroxide is not changed.

Example 6

If a suspension of 40 grams borax in 200 cc. water under a mild current of carbon dioxide is used as the hydrolyzing agent, the peroxide is recoverable in the form of a perborate with an 80% theoretical yield.

Example 7

Into a horizontal cylindrical reactor of 1 liter capacity, an amalgam containing 0.2% potassium and 200 cc. of a solution of benzophenone in benzene (0.2 mole per liter) is introduced. The metal-ketone compound (blue coloration) is allowed to form under an inert atmosphere, and then an oxygen atmosphere is introduced at atmospheric pressure and ordinary temperature. The reactor is slowly rotated about its axis in a manner to renew the organic amalgam interface continuously and to assure contact between the organic phase and the oxygen. The coloration of the metal-ketone disappears almost instantly and the absorption of oxygen continues regularly. After about 1 hour the amalgam is drawn off. Its analysis shows that it does not contain more than traces of potassium, generally less than 0.02% by weight. A new charge of amalgam can then be introduced and the oxygenation resumed.

After the last portion of the amalgam has been removed, the organic phase is allowed to remain several minutes in contact with the oxygen until oxygen absorption ceases. The precipitated superoxide can be isolated or it can be analyzed by acid hydrolysis while in suspension, the superoxide oxygen which is liberated during the hydrolysis being determined volumetrically and the amount of the resulting hydrogen peroxide measured. In this manner a 94% conversion of the potassium into superoxide is effected, the remainder being in the form of potash or simple $K_2O$.

EXAMPLE 8

Example 7 is repeated, but with the benzophenone solution replaced by another benzophenone solution of lower concentration (0.075 mole/liter) and additionally containing 0.075 mole/liter of hexamethyl-phosphoramide.

In this manner and without diminution of the reaction speed, there is obtained 0.09 mole of potassium superoxide or 6 times the molecular proportion of the benzophenone or the hexamethyl-phosphoramide that was used.

The yield of superoxide is quantitative.

An analysis of the organic phase shows that the benzophenone and the hexamethyl-phosphoramide have not been consumed.

EXAMPLE 9

In a cylindrical reactor with a vertical axis and a total capacity of 750 cc., the bottom of which is constituted of a layer of 0.15% by weight of potassium amalgam which is continually being renewed, 500 cc. of a benzene solution of benzophenone (0.1 mole per liter) and of hexamethyl-phosphoramide (0.1 mole per liter) are introduced. Oxygen can be introduced immediately, but it is generally better practice to at first assure the formation of the metal-ketone compound by the use of an inert atmosphere. Upon introduction of the oxygen (under atmospheric pressure and ordinary temperature), the coloration of the organometallic complex disappears and the absorption proceeds uniformly. An effective distribution of the oxygen into the organic phase is maintained. The amalgam, continuously introduced and drawn off at the base of the apparatus, is recycled after being recharged in an electrolysis cell.

The precipitate which is formed is separated by decantation or filtration, washed, and dried under vacuum. The yield is 38 grams superoxide, a substantially quantitative yield relative to the oxygen absorbed.

The product contains 232 cc. of peroxide or superoxide oxygen per gram, which is 98% of the theoretical.

EXAMPLE 10

Example 7 is repeated but with the benzophenone solution replaced by a fluorenone solution (0.1 mole per liter) and by a hexamethyl-phosphoramide solution (0.1 mole per liter).

After oxidation and acid hydrolysis the resulting suspension is analyzed by volumetric determination of the superoxide oxygen and ratio of the formed hydrogen peroxide. In this manner there is found to be a 95% conversion of the potassium into superoxide.

EXAMPLE 11

Example 4 is repeated by replacing the benzophenone by phenyl-biphenylketone and the yield of superoxide, determined as in Example 1, is 92%.

EXAMPLE 12

Example 7 is repeated, but with the benzophenone solution replaced by a similar benzophenone solution of the same concentration but containing additionally 0.2 mole dimethylsulfoxide per liter. In this manner 0.2 mole mole potassium superoxide is formed while the reaction speed remains constant. This corresponds to a calculated yield of 90% on the basis of the potassium that is consumed.

During the above experiments there has not been observed any diminution of the speed of the reaction, so that it should have been possible to continue these experiments with the same success for much longer periods of time.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of alkali metal peroxides, comprising the steps of contacting a solution of a non-enolizable ketone in a liquid hydrocarbon with an alkali metal amalgam and reacting the resultant dissolved reaction product with molecular oxygen to form alkali metal peroxides which separate as solids from the solution, said non-enolizable ketone being of the formula R—CO—R' wherein at least one of the radicals R and R' represents a monovalent aromatic homocyclic or heterocyclic hydrocarbon radical or a radical of the formula

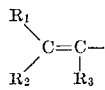

wherein:
$R_1$ and $R_2$ are selected from the group consisting of hydrogen atoms and monovalent hydrocarbon radicals, and $R_3$ is a monovalent hydrocarbon radical; and with the provision that where R or R' is not defined as above, it represents a monovalent aliphatic or cycloaliphatic hydrocarbon radical, completely substituted in the α-position relative to the carbonyl group.

2. The process of claim 1 in which the liquid phase, after separation from the alkali metal peroxide, is recycled to contact fresh amalgam.

3. The process of claim 1 wherein the ketone is benzophenone.

4. The process of claim 1 wherein the hydrocarbon is an aromatic hydrocarbon.

5. The process of claim 1 wherein the hydrocarbon is benzene.

6. The process of claim 1 wherein the ketone concentration in the hydrocarbon is between 0.05 and 1 mole per liter of solution.

7. The process of claim 1 wherein the process is conducted at a temperature of between −10 and +70° C.

8. The process of claim 1 wherein a Lewis base is added to the ketone solution, the proportion of said Lewis base being about 0.01–1 mol per liter of said ketone solution.

9. The process of claim 8 wherein said Lewis base is hexamethylphosphoramide.

10. A process as defined by claim 1 wherein the ketone solution is brought into contact with the amalgam while at the same time the solution is oxidized, the amalgam being at the bottom of the reaction zone beneath the ketone solution and molecular oxygen being introduced at a level above the amalgam solution interface.

11. A process as defined by claim 1 wherein the peroxide of the alkali metal is converted into another peroxide by adding a compound capable of being converted into said another peroxide ot the suspension of the peroxide of the alkali metal obtained in the ketone solution.

12. The process of claim 1 wherein a mineral acid is added to the peroxide suspension in the ketone solution to form hydrogen peroxide.

13. A process for the production of an alkali metal peroxide, comprising the steps of dissolving a non-enolizable ketone in a liquid hydrocarbon, and then reacting the resulting dissolved ketone with an alkali metal and then reacting the resultant reaction product with molecular oxygen, said non-enolizable ketone being of the formula R—CO—R' wherein at least one of the radicals R and R' represents a monovalent aromatic homocyclic or heterocyclic hydrocarbon radical or a radical of the formula

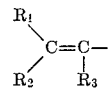

wherein:
$R_1$ and $R_2$ are selected from the group consisting of hydrogen atoms and monovalent hydrocarbon radicals, and $R_3$ is a monovalent hydrocarbon radical; and with the provision that where R or R' is not defined as above, it represents a monovalent aliphatic or cycloaliphatic hydrocarbon radical, completely substituted in the α-position relative ot the carbonyl group.

14. The process of claim 13 wherein the ketone is benzophenone and the hydrocarbon is benzene.

15. A process as defined by claim 1 wherein said non-enolizable ketone is selected from the group consisting of fluorenone, phenyl-biphenyl-ketone, di-biphenyl-ketone, xanthone, phenyl-naphthyl ketone, dinaphthyl-ketone, 2-propenyl-phenyl-ketone, α-pyridyl-phenyl-ketone and 2-propenyl-t.butylketone.

16. A process as defined by claim 13 wherein said non-enolizable ketone is selected from the group consisting of fluorenone, phenyl-biphenyl-ketone, di-biphenyl-ketone, xanthone, phenyl-naphthyl ketone, dinaphthyl-ketone, 2-propenyl-phenyl-ketone, α-pyridyl-phenyl-ketone and 2-propenyl-t.butylketone.

References Cited

UNITED STATES PATENTS

| | | | |
|---|---|---|---|
| 2,083,691 | 6/1937 | Cunningham | 23—184 |
| 2,158,523 | 5/1939 | Pfleiderer | 23—184 |
| 2,215,856 | 9/1940 | Pfleiderer | 23—184 |

EDWARD J. MEROS, *Primary Examiner.*